Patented Nov. 13, 1951

2,574,693

UNITED STATES PATENT OFFICE 2,574,693

PRODUCTION OF SECONDARY ALIPHATIC AMINES FROM PRIMARY ALIPHATIC AMINES

Willem Frederik Engel and Han Hoog, Badhuisweg, Netherlands, assignors to Shell Development Company, San Francisco, Calif., a corporation of Delaware No Drawing. Application June 10, 1948, Serial No. 32,274. In the Netherlands June 11, 1947

7 Claims. (Cl. 260—563)

This invention relates to an improved process for the catalytic production of secondary aliphatic amines from primary aliphatic amines.

Production of secondary aliphatic amines from primary aliphatic amines by methods available heretofore is generally handicapped by low yields of the desired secondary amine and by side reactions unavoidably present in such processes to a degree often militating against practical operation. Principal side reactions generally encountered in such processes disclosed heretofore result in the conversion of at least a substantial part of the amine charge to olefinic hydrocarbons and other undesirable by-products.

It is an object of the present invention to provide an improved process enabling the more efficient production of secondary aliphatic amines from the corresponding primary aliphatic amines with a minimum of side reactions and with substantially increased yields of the desired secondary amines.

In accordance with the process of the invention aliphatic primary amines are converted to the corresponding aliphatic secondary amines in the absence of any substantial decomposition of amines by contacting the aliphatic primary amines with a catalyst consisting essentially of aluminum oxide at a temperature of about 275° C. to about 500° C. at an elevated pressure and in the presence of externally introduced ammonia.

Catalysts employed in the process of the invention comprise the naturally occurring, or synthetically prepared, aluminum oxides or aluminum oxide-containing materials. Particularly suitable catalysts comprise the highly porous aluminous materials of natural or synthetic origin. Examples of catalyst materials of naturally occurring origin are adsorptive alumina, bauxite, the activated aluminas of commerce, and the like. Preferred catalysts comprise the synthetically prepared aluminas. Particularly preferred are the synthetically prepared aluminas comprising the precipitated aluminum oxides. Such preferred catalysts are obtained, for example, by precipitation of the aluminum oxides from a solution of an aluminum salt, for example, by means of an alkali metal or compound thereof, or by precipitation from an alkali aluminate by means of an acid. It is, however, in no way intended to limit the invention to the use of catalysts comprising aluminum oxide obtained from any specific source or produced in a specific manner. Suitable aluminum oxides are obtained, for example, by precipitation from sodium aluminate solutions with carbonic acid.

Catalysts particularly effective in the execution of the process of the invention comprise aluminum oxides which have been activated by acid treatment. The acid treatment results in catalysts of enhanced catalytic activity due not only to substantial removal of alkali materials from the catalyst but because of the modification of surface properties. In such activation of the catalyst the aluminum oxide is contacted with a suitable acid for a sufficient length of time to activate the catalyst. The acid employed may be a mineral acid or an organic acid. Suitable mineral acids comprise, for example, hydrochloric acid, hydrofluoric acid, nitric acid, the phosphoric acids etc. Suitable organic acids comprise, for example, formic acid, acetic acid, dichloracetic acid, trichloracetic acid, monochloracetic acid, oxalic acid, tartaric acid and the like. The concentration of the acid employed in the activation treatment, as well as the time of contact with the aluminum oxide or aluminum oxide-containing material, may vary in accordance with the particular acid employed and the particular aluminum oxide treated. The acid concentration as well as the time of contact, are preferably controlled to avoid solution and/or disintegration to any substantial degree of the solid material treated with the acid. Aluminum oxide, such as obtained by precipitation from a sodium-aluminate solution by means of carbon dioxide and drying of the precipitate, is converted to a catalyst of high activity for the present process by contact with 2N hydrochloric acid at 80° C. for a period of about two hours. The temperature at which the aluminum oxide is contacted with the acid may also be varied in accordance with the particular acid and aluminum oxide employed. It is controlled to avoid the solution or disintegration to any substantial degree of the aluminum oxide during its contact with the acid. In general, temperatures below about 100° C., for example, ranging from room temperature to about 80° C. are suitable.

Since removal of alkali material from the catalyst and modification of the surface properties is a desired result of the acid treatment, the use of strong acids such as concentrated mineral acids, are particularly preferred.

In order to prevent dissolution of the aluminum oxide during the acid treatment, the aluminum oxide may be subjected to a temperature in the range of from about 450° C. to about 700° C. prior to the acid treatment.

The acid treated aluminum oxide catalyst is preferably washed and dried before utilization in the process. It is preferably washed with water until free of any substantial amounts of acid. In a preferred method of preparing a catalyst, the acid-treated aluminum oxide is washed with an aqueous solution of compounds capable of effecting an ion-exchange with any remaining alkali contaminant in the aluminum oxide. Suitable washing solutions comprise, for example, solutions of any ammonium salt, such as ammonium carbonate, ammonium sulfate, and the like, capable of replacing alkali contaminants such as sodium or potassium, in the catalyst.

The acid treated, and preferably washed, aluminum oxide catalysts are dried at elevated temperature. The drying operation is preferably effected at a temperature below about 600° C., for example, not substantially in excess of about 550° C. In a preferred method of preparing catalysts the washed, acid treated aluminum oxide is first dried at a relatively low temperature, for example, about 150° C., and thereafter further dried at a higher temperature, for example, up to about 500° C. The drying operation may be carried out in a stream of air or any other inert gaseous medium, such as for example, nitrogen, carbon dioxide, hydrogen flue gas, and the like.

The aluminum oxide employed as catalyst may be subjected to any suitable type of forming, pelleting, extruding or shaping operation. The catalysts may be employed as such or may be combined with suitable inert solid support or diluent material such as, for example, crushed brick, silica gel, magnesium oxide, asbestos, porous plate, pumice and the like.

Promoters capable of increasing the effectiveness of the catalyst may be combined with the aluminum oxide. They may be added before, after or during the activation operation when such pretreatment is resorted to. Suitable promoters comprise, for example, a metal of the first transition series of the periodic table or the oxides thereof such as copper oxide.

The acid treated aluminum oxide catalysts when employed in the process of the invention retain their activity over relatively long periods of time. When conversion does drop to a value below that commensurate with practical operation, the catalyst is readily restored to substantially original activity by heating at an elevated temperature, for example, within the range of from about 275° C. to about 500° C. in a stream of oxygen or an oxygen-containing gas such as air, and optionally in the presence of a diluent gas such as steam, flue gas, nitrogen or the like. The reconditioning of the catalyst at the elevated temperature in the presence of an oxygen or an oxygen-containing gas may be followed by the acid treatment step defined above. When thus subjecting the catalyst to acid treatment during the regeneration process, it is preferably washed and dried under the conditions defined above in the prescribed method of preparing the particularly effective type of catalyst.

An acid treated aluminum oxide catalyst was prepared by stirring an aluminum nitrate solution containing 27 grams of aluminum per liter with added 3N potassium hydroxide solution at a temperature of 85° C. Sufficient potassium hydroxide was added to result in a pH of 6.5 to 7. The precipitate was filtered from the mixture, washed with distilled water at 80° C., and dried at 100° C. The dried precipitate was broken into pieces and heated at 500° C. for a period of three hours. The aluminum oxide catalyst thus obtained was treated with 15% aqueous hydrochloric acid at 95° C. The acid treated catalyst was washed with distilled water until substantially free of alkali and chlorine, then dried at 110° C. and heated at 500° C. for a period of three hours.

Aliphatic primary amines converted to the corresponding secondary aliphatic amines in accordance with the process of the invention comprise broadly the aliphatic primary amines including the aliphatic amines wherein the aliphatic hydrocarbon radical is either of open chain or cyclic structure. The aliphatic primary amines charged to the process of the invention are represented by the formula $RNH_2$ wherein R represents an alkyl or cycloalkyl group which may be further substituted by cycloalkyl and alkyl groups, respectively. Representative of such aliphatic primary amines are the following: methylamine, ethylamine, propylamine, isopropylamine, butylamine, isobutylamine, pentylamine, isopentylamine, hexylamine, isohexylamine, octylamine, isooctylamine, dodecylamine, cyclopropylamine, (cyclohexylmethyl)-amine, (cyclobutylmethyl)-amine, cyclohexylamine, (cyclopropyl-methyl)-amine, cyclopentylamine, methyl-cyclopentylamine, cyclopentylmethylamine, cycloheptylamine, methyl-cyclohexylamine, cyclopropylethylamine and their homologues.

The charge to the process of the invention need not necessarily consist of only a single aliphatic primary amine, but may comprise two or more such primary aliphatic amines. Diluent gaseous material, capable or not of undergoing conversion under conditions of execution of the reaction, may be included in the charge to the reaction zone, or may be separately introduced therein at one or a plurality of points along the length thereof. Suitable diluent materials comprise, for example, nitrogen, carbon dioxide, the normally gaseous paraffins, etc.

The charge comprising the primary aliphatic amines is contacted with the aluminum oxide catalyst at a temperature of, for example, about 275° C. to about 500° C., and preferably about 300° C. to about 400° C.

Gaseous activators, for example a hydrogen halide such as hydrogen chloride, or a compound giving rise to a hydrogen halide under the operating conditions, a halogenated hydrocarbon, $CCl_4$, etc., may be added in activating amounts to the amine charge to the process or separately introduced into the reaction zone.

It has been found, however, that though the contacting of the primary aliphatic amines with the aluminum oxide catalysts at pressures in the neighborhood of atmospheric pressure results in the formation of products containing some secondary aliphatic amines, the yield of the desired secondary amines is generally so low and the degree at which side reactions prevail so extensive as to militate against practical operation. In general it has been found that under these conditions a substantial portion of the charge is converted to olefinic material and undesired normally gaseous and normally liquid by-products. Attempts to eliminate the substantial decomposition of the charge by reduction of the operating temperature at these relatively low pressures generally enables reduction of the production olefins corresponding to the amine charged but still results in a process giving exceedingly low yields of the desired secondary aliphatic amine together with a relatively high conversion to other normally gaseous and normally liquid by-products.

Thus normal butylamine was contacted at a temperature of 375° C., atmospheric pressure and a liquid hourly space velocity of 0.09, with a portion of the hydrochloric acid-treated catalyst, the preparation of which catalyst by the method involving precipitation from aluminum nitrate solution with potassium hydroxide was described above. The n-butylamine charge contained 0.3% by weight of CCl₄. Only 13 mol percent of the n-butylamine charged was converted to the desired dibutylamine; whereas 30 mol percent of the charge was converted to butene, 8 mol percent to methane and 34 mol percent to liquid by-products. 15 mol percent of the charge was recovered as unconverted primary amine.

Upon repetition of the experiment at a temperature of 260° C. under otherwise substantially identical conditions, conversion of charge to butene was substantially eliminated by a conversion of n-butylamine to dibutylamine of only 12 mol percent was obtained for a concomitant conversion of n-butylamine to undesired by-products consisting essentially of methane and normally liquid products of 9 mol percent, 79 mol percent of the amine charge was recovered as unconverted n-butylamine.

It is thus apparent that though conversion of the amine charge to the corresponding olefin can be substantially eliminated in such operation at pressures in the neighborhood of atmospheric by resort to the use of relatively low temperatures, the yields of the desired secondary aliphatic amine is so low, and the relative production of by-products so high, as to render the process generally highly impractical.

It has now been found, however, that the above difficulties are completely obviated, the desired secondary aliphatic amines produced with substantially higher yields and with a minimum production of undesired by-products, by effecting the operation at elevated pressures while introducing ammonia into the reaction zone from an external source.

The substantial improvements, it has been found, are obtained by the utilization of pressures in excess of about 70 pounds, for example, a pressure in the range of from about 70 to about 750 pounds. The use of pressures in excess of about 250 pounds are somewhat preferred.

Ammonia is introduced into the reaction zone in an amount at least equal to 0.1 mol of ammonia per mol of primary amine charged. Addition of the ammonia in an amount in the range of, for example, from about 0.1 mol to about 5 mols of ammonia per mol of primary amine charged has been found highly suitable. The introduction of the ammonia in an amount at least equal to 0.5 mol of ammonia per mol of primary amine charged is particularly preferred. Greater or lesser amounts of ammonia may however be introduced into the reaction zone from an external source within the scope of the invention. The ammonia introduced into the reaction zone from an external source may be admixed with the amine charge prior to introduction into the reaction zone, or a part or all of the ammonia may be separately introduced into the reaction zone at one or a plurality of points thereof. The ammonia introduced into the reaction zone may be obtained from any suitable source and may consist in part or entirety of ammonia separated from the effluence from the reaction zone.

Under the above-defined conditions of elevated pressure operation, and in the presence of the added ammonia, the primary aliphatic amine is converted within the reaction zone to the corresponding secondary aliphatic amine with high yields and with a minimum formation of undesired by-products. The overall reaction may be illustrated by the empirical formula:

$$2RNH_2 \rightarrow R_2NH + NH_3$$

wherein R is an alkyl radical or cyclo-alkyl radical as defined above.

Thus, n-butylamine, containing 0.3% CCl₄, was contacted at 350° C., a pressure of 285 pounds, and a liquid hourly space velocity of 0.10, with a portion of the hydrochloric acid-treated aluminum oxide catalyst the preparation of which is set forth above and portions of which identical catalyst were employed in the operations at atmospheric pressure described above. Ammonia in an amount of 1 mol of ammonia per 2 mols of n-butylamine charged, was introduced into the reaction zone. 34 mol percent of the n-butylamine charged was converted to dibutylamine. The conversion of amine charge to butene amounted to only 3 mol percent, and the conversion to by-products consisting essentially of methane and normally liquid products also only 3 mol percent.

Analogous experiments carried out with isopropylamine and cyclohexylamine as the charge resulted in the production of diisopropylamine and dicyclohexylamine respectively with equally high efficiency. In a similar manner ethylamine is converted to diethylamine, propylamine to dipropylamine, pentylamines to dipentylamines, cyclohexylamine to dicyclohexylamine and (cyclohexylmethyl) - amine to di - (cyclohexylmethyl)-amine.

It is thus seen that utilization of the elevated pressures in combination with the presence in the reaction zone of externally introduced ammonia brings within the realm of practicality the catalytic conversion of primary aliphatic amines to the corresponding secondary aliphatic amines.

We claim as our invention:

1. A process for the production of dibutylamine from n-butylamine which comprises contacting n-butylamine in admixture with about 0.5 to about 5 mols of ammonia per mol of n-butylamine with an aluminum oxide catalyst at a temperature above about 300° C. but below 400° C. and a pressure of about 250 to about 750 pounds.

2. A process for the production of dibutylamine from butylamine which comprises contacting butylamine in admixture with about 0.1 to about 5 mols of ammonia per mol of butylamine with an aluminum oxide catalyst at a temperature of about 275° C. to about 500° C. and a pressure of about 70 to about 750 pounds.

3. A process for the production of dicyclohexylamine from cyclohexylamine which comprises contacting cyclohexylamine in admixture with about 0.5 to about 5 mols of ammonia per mol of cyclohexylamine with an aluminum oxide catalyst at a temperature of about 275° C. to about 500° C. and a pressure of about 70 to about 750 pounds.

4. A process for the production of a dialkylamine which comprises contacting the corresponding alkylamine in admixture with about 0.5 to about 5 mols of added ammonia per mol of said alkylamine with an aluminum oxide catalyst at a temperature above about 300° C. but below 400° C. and a pressure of about 250 to about 750 pounds.

5. A process for the production of a dialkylamine which comprises contacting the corresponding alkylamine in admixture with about 0.1 to about 5 mols of added ammonia per mol of said alkylamine with an aluminum oxide catalyst at a temperature of about 275° C. to about 500° C. and a pressure of about 70 to about 750 pounds.

6. A process for the production of a secondary saturated aliphatic hydrocarbon amine which comprises contacting the corresponding primary saturated aliphatic hydrocarbon amine in admixture with about 0.1 to about 5 mols of ammonia per mol of said saturated primary aliphatic hydrocarbon amine with an aluminum oxide catalyst at a temperature of about 275° C. to about 500° C. and a pressure of about 70 to about 750 pounds.

7. A process for the production of a dialkyl amine which comprises contacting the corresponding alkyl amine in admixture with about 0.1 to about 5 mols of ammonia per mol of said primary amine with an aluminum oxide catalyst in a reaction zone at a temperature of about 275° C. to about 500° C. and a pressure of about 70 to about 750 pounds, thereby converting said alkyl amine to reaction products comprising said dialkyl amine and ammonia, separating a fraction comprising ammonia and a fraction comprising said dialkyl amine from the effluence of said reaction zone, and recycling at least a part of said fraction comprising said ammonia to said reaction zone.

WILLEM FREDERIK ENGEL.
HAN HOOG.

REFERENCES CITED

The following references are of record in the file of this patent:

UNITED STATES PATENTS

| Number | Name | Date |
|---|---|---|
| 2,098,039 | Hill et al. | Nov. 2, 1937 |

FOREIGN PATENTS

| Number | Country | Date |
|---|---|---|
| 609,245 | Germany | Aug. 27, 1933 |